(12) United States Patent
Bouvet et al.

(10) Patent No.: US 11,115,441 B2
(45) Date of Patent: Sep. 7, 2021

(54) METHOD AND SERVER FOR SELECTING AN ENTRY SERVER OF AN IMS COMMUNICATION NETWORK

(71) Applicant: Orange, Issy-les-Moulineaux (FR)

(72) Inventors: Bertrand Bouvet, Perros Guirec (FR); Stephane Boizard, Fronton (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 15/998,559

(22) PCT Filed: Feb. 10, 2017

(86) PCT No.: PCT/FR2017/050309
§ 371 (c)(1),
(2) Date: Aug. 15, 2018

(87) PCT Pub. No.: WO2017/140971
PCT Pub. Date: Aug. 24, 2017

(65) Prior Publication Data
US 2019/0075139 A1 Mar. 7, 2019

(30) Foreign Application Priority Data
Feb. 15, 2016 (FR) ...................... 1651200

(51) Int. Cl.
*G06F 15/16* (2006.01)
*H04L 29/06* (2006.01)
(Continued)

(52) U.S. Cl.
CPC ........ *H04L 65/1016* (2013.01); *H04L 65/105* (2013.01); *H04L 65/1006* (2013.01);
(Continued)

(58) Field of Classification Search
CPC ............. H04L 65/1006; H04L 65/1016; H04L 65/1043; H04L 65/1073
See application file for complete search history.

(56) References Cited

U.S. PATENT DOCUMENTS

2003/0154400 A1* 8/2003 Pirttimaa ................ H04L 29/06
726/14
2004/0146040 A1* 7/2004 Phan-Anh ........... H04L 65/1016
370/349
(Continued)

FOREIGN PATENT DOCUMENTS

KR 20110040151 A 4/2011

OTHER PUBLICATIONS

International Search Report dated May 3, 2017 for corresponding International Application No. PCT/FR2017/050309, filed n Feb. 10, 2017.
(Continued)

*Primary Examiner* — Yves Dalencourt
(74) *Attorney, Agent, or Firm* — David D. Brush; Westman, Champlin & Koehler, P.A.

(57) ABSTRACT

A method and a proxy server for selecting an input server of an IMS communication network in order to register a terminal in the IMS communication network. Following receipt from the terminal of an SIP registration message, the proxy server obtains a value of at least one field of the SIP registration message, the field being representative of a characteristic belonging to the terminal, and selects an input server using the at least one value obtained. Then, the proxy server sends, to the terminal, an SIP redirection message including an IP address of the selected input server.

20 Claims, 1 Drawing Sheet

(51) Int. Cl.
  *H04L 29/08*     (2006.01)
  *H04W 80/10*     (2009.01)
(52) U.S. Cl.
  CPC ...... *H04L 65/1073* (2013.01); *H04L 67/1014* (2013.01); *H04L 67/2814* (2013.01); *H04W 80/10* (2013.01)

(56) References Cited

U.S. PATENT DOCUMENTS

| | | | | |
|---|---|---|---|---|
| 2005/0060411 | A1* | 3/2005 | Coulombe | H04L 69/24 709/227 |
| 2008/0166994 | A1* | 7/2008 | Ku | H04L 65/1016 455/406 |
| 2008/0256251 | A1 | 10/2008 | Huotari et al. | |
| 2009/0225746 | A1* | 9/2009 | Jackson | H04L 65/80 370/352 |
| 2015/0201320 | A1 | 7/2015 | Narkar et al. | |
| 2016/0066133 | A1* | 3/2016 | Li | H04W 48/16 455/456.3 |

OTHER PUBLICATIONS

Written Opinion from the International Searching Authority dated May 3, 2017 for corresponding International Application No. PCT/FR2017/050309, filed on Feb. 10, 2017.

English translation of the International Preliminary Report on Patentability and Written Opinion from the International Searching Authority dated May 11, 2017 for corresponding International Application No. PCT/FR2017/050309, filed on Feb. 10, 2017.

* cited by examiner

METHOD AND SERVER FOR SELECTING AN ENTRY SERVER OF AN IMS COMMUNICATION NETWORK

CROSS-REFERENCE TO RELATED APPLICATIONS

This Application is a Section 371 National Stage Application of International Application No. PCT/FR2017/050309, filed Feb. 10, 2017, the content of which is incorporated herein by reference in its entirety, and published as WO 2017/140971 on Aug. 24, 2017, not in English.

FIELD OF THE DISCLOSURE

The invention lies in the field of communication networks. It relates to a device and a method for connecting terminals linked by an IP (Internet Protocol in English) communication network.

BACKGROUND OF THE DISCLOSURE

To be able to use the communication services of a communication network of IMS (IP Internet Protocol Multimedia Subsystem in English) type, a terminal must be registered in the IMS communication network. For that, the terminal needs to know the IP address of a server serving the entry point to the IMS communication network. Such a server is known to the person skilled in the art by the name P-CSCF (Proxy Call State Call Control in English).

For a fixed IMS communication network, the terminal obtains the IP address of the P-CSCF server from its VoIP (Voice Over IP) configuration file according to protocol TR-104/TR069 defined by the ADSL Forum. The terminal then obtains either an IP address of the P-CSCF with a port number (higher than 1024) and a protocol (UDP, TCP or TLS) to be used in exchanges of SIP (Session Initiation Protocol) with the P-CSCF, or a FQDN (Fully Qualified Domain Name in English) domain name of the P-CSCF. In the latter case, the terminal must then interrogate a DNS (Domain Server Name in English) server to obtain the IP address of the P-CSCF, the port number and the protocol to be used, via a DNS SRV request.

For a mobile IMS communication network of ViLTE/VoLTE/VoWIFI (Video over LTE, Long Term Evolution, Voice over LTE and Voice over WIFI) type, the terminal obtains only the IP address of the P-CSCF according to the PCO (Parameters Configuration Options) protocol of the 3GPP (Third Generation Partnership Project). When the standardization of these services is finished, the terminal will be able to use a Device Management function according to the http/HTTPS or OMA-DM protocol defined by the GSMA (Group Special Mobile Association) standard which makes it possible to supply the IP address, port and protocol or a domain name of the P-CSCF in a configuration file.

With such mechanisms, it appears that the terminal and the P-CSCF are forced to use port 5060 and the UDP and TCP protocols to communicate between themselves since the port number and the transport protocol to be used are not explicitly supplied to the terminal. Such a constraint impacts the performance levels of a P-CSCF server of a communication network operator when the latter has put in place particular processing functions dependent on the services supplied by the P-CSCF. For example, it is common practice for an operator to apply an HMR (Header Manipulation Rules) mechanism which makes it possible to manipulate (add, delete, modify) certain contents or headers of SIP messages. Such manipulations are necessary when terminals are not fully compatible with the implementation of the SIP protocol implemented at the P-CSCF level or to resolve SIP compatibility constraints of certain nodes of the communication network.

Such HMR manipulations are costly in terms of resources of the P-CSCF because the P-CSCF must analyze all the SIP messages that it receives to know whether HMR manipulations are necessary, and which of them.

SUMMARY

One of the aims of the invention is to provide improvements over the state of the art.

To this end, it proposes a method for selecting an entry server of an IMS communication network, implemented by a proxy server of said network. Such a method comprises, following the reception from a terminal of a registration message sent according to the SIP protocol, the steps of obtaining of a value of at least one field of the SIP registration message, said field being representative of a characteristic specific to the terminal, of selection of an entry server, from at least said obtained value, and of sending to the terminal of an SIP redirect message comprising an IP address of said selected entry server.

The method according to the invention thus makes it possible to select, for a terminal, a point of entry to the IMS communication network based on a characteristic specific to said terminal. Such a characteristic can correspond to the type of the terminal, to its operating system, to the services supported by the terminal, to its type of public identity, to its type of access, etc.

It is thus possible to alleviate the load of the entry point servers of the network by distinguishing the terminals that these entry points have to manage according to the characteristics of these terminals. The application of specific HMR processing functions to the headers of SIP messages by the entry point servers is thus facilitated.

According to another example, selecting a P-CSCF according to the type of public identity of the terminal (fixed, mobile) makes it possible to optimize the routing mechanisms upon the reception or the transmission of a telephone communication.

Advantageously, the proxy server redirects the terminal to the selected entry server for the selected entry server to perform the registration of the terminal in the IMS communication network. The proxy server therefore receives only the first registration message sent by the terminals which want to be registered on the IMS communication network. It does not therefore have to analyze the header of all the SIP messages sent by these terminals.

The invention relates also to a method for registering a terminal in an IMS communication network, implemented by said terminal. Such a registration method comprises steps of sending of a first registration message to a proxy server of the IMS communication network, said first registration message comprising at least one field representative of a characteristic specific to the terminal, of reception, from the proxy server, of a redirect message comprising an IP address of an entry server of the IMS communication network, the entry server being selected from a value of said at least one field, and of sending of a second registration message to said entry server of the IMS communication network.

Thus, to be registered with the communication network, the terminal has an IP address of a P-CSCF server selected according to a characteristic specific to the terminal. The terminal can then be registered with a P-CSCF configured according to this characteristic, which makes it possible to improve the service provided to the terminal. For example, the incoming/outgoing call setup time is reduced because there are then less HMR processing functions and the latter are adapted to the types of terminals using the selected P-CSCF. It is thus possible to define HMRs dedicated to the types of terminals managed by the selected P-CSCF, for example by deleting unsupported codecs from the SDP (Session Description Protocol) offer so as to limit the size of the IP packets and avoid the fragmentation of the IP packets.

The different embodiments or features mentioned hereinbelow can be added independently or in combination with one another, to the features of the method for selecting an entry server defined above or to the features of the method for registering a terminal defined above.

According to a particular embodiment of the invention, the field of the registration message is an SIP User Agent field. Advantageously, the SIP User Agent field makes it possible to determine the type of the terminal and in particular the operating system of the terminal (Apple™, Android™, Microsoft™) and the version number. This particular embodiment of the invention makes it possible to more easily deploy and manage P-CSCF which are suitable for handling only a certain category of terminals.

According to another particular embodiment of the invention, the field of the registration message is an SIP PANI field. The SIP PANI (Private Access Network Info) field makes it possible to obtain in particular the type of access (2G, 3G, 4G, WIFI, ADSL, fiber, cable, etc.) of the terminal to the communication network, and the cell identifiers in the case of 2G/3G/4G cellular networks. Advantageously, the invention makes it possible to select a P-CSCF according to the access technology of the terminal and thus adapt, for example, the quality of service (QoS for quality of service in English) according to the access technology, the obtaining of the location of the terminal, or even the processing of an emergency message according to the location. This particular embodiment of the invention makes it possible to reduce the costs (software license, level of redundancy of the equipment items, specific equipment items, etc.) by using platforms that are specialized according to the access technology.

According to another particular embodiment of the invention, the redirect message comprises a port number and a protocol determined by the proxy server as a function of a field of the registration message received by the proxy server. Advantageously, this particular embodiment of the invention makes it possible to determine the port number and the protocol to be used by the terminal to communicate with the selected P-CSCF server, according to the characteristics of the terminal, for example according to services supported by the terminal such as those indicated in the "features tags" or +g.3gpp.icsi-ref field of an SIP REGISTER message.

According to another particular embodiment of the invention, when the proxy server receives a first registration message from another terminal distinct from the first terminal and comprising a public identity identical to the public identity of said first terminal, the proxy server selects, for the other terminal, the same entry server as the entry server selected for the first terminal.

In this particular embodiment of the invention, terminals sharing a same public identity are registered via a same entry server of the IMS communication network. Advantageously, the resources of the IMS communication network are optimized, in particular upon the reception of communications to said public identity. Furthermore, the terminals will have a greater probability of being notified of an incoming session within identical delays since the SIP call signaling will take the same path to the access.

The invention relates also to a proxy server of an IMS communication network, comprising a processing module configured to, on reception by a communication module of a registration message sent according to the SIP protocol by a terminal:
    obtain a value of a field of the SIP registration message, said field being representative of a characteristic specific to the terminal,
    select an entry server, from the obtained value,
    order the sending by the communication module to the terminal of an SIP redirect message comprising an IP address of said selected entry server.

The invention relates also to a terminal comprising a communication module capable of:
    sending a first registration message to a proxy server of the IMS communication network, said first registration message comprising at least one field representative of a characteristic specific to the terminal,
    receiving, from the proxy server, a redirect message comprising an IP address of an entry server of the IMS communication network, the entry server being selected from a value of said at least one field,
    sending a second registration message to said entry server of the IMS communication network.

In a particular embodiment of the invention, the different steps of the method for selecting an entry server of the method for registering a terminal are implemented by instructions of computer programs.

Consequently, the invention also targets computer programs on an information medium, these programs being able to be implemented respectively in a terminal or, more generally, in a computer, these programs respectively comprising instructions suitable for implementing the different steps of the method for selecting an entry server and of the method for registering a terminal which have just been described.

These programs can use any programming language, and be in the form of source code, object code, or of intermediate code between source code and object code, such as in a partially compiled form, or in any other desirable form.

The invention also targets a computer-readable information medium, comprising instructions of a computer program as mentioned above.

The information medium can be any entity or device capable of storing the program. For example, the medium can comprise a storage means, such as a ROM, for example a CD ROM or a microelectronic circuit ROM, or even a magnetic or electronic storage means, for example a USB stick or a hard disk.

Also, the information medium can be a transmissible medium such as an electrical or optical signal, which can be routed via an electrical or optical cable, wirelessly or by other means. The program according to the invention can in particular be downloaded over a network of Internet type.

Alternatively, the information medium can be an integrated circuit in which the program is incorporated, the circuit being adapted to execute or to be used in the execution of the methods concerned.

The advantages of the server for selecting an entry server, of the terminal, of the computer programs and of the information media are identical to those presented in relation to the method for selecting an entry server and the method for registering a terminal.

BRIEF DESCRIPTION OF THE DRAWINGS

Other advantages and features of the invention will become more clearly apparent on reading the following description of a particular embodiment of the invention, given as a simple illustrative and nonlimiting example, and the attaching drawings, in which.

DESCRIPTION OF A PARTICULAR EMBODIMENT OF THE INVENTION

Figure 1:
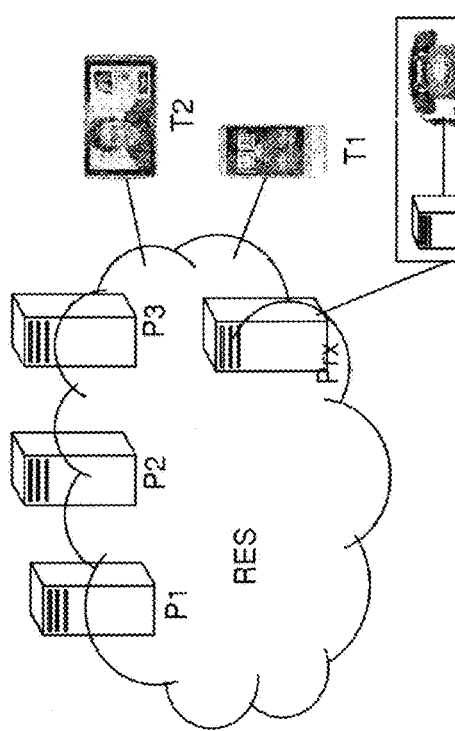
FIG. 1 illustrates an environment of implementation of the invention according to a particular embodiment of the invention.

FIG. 1 illustrates an environment of implementation of the invention according to a particular embodiment of the invention. FIG. 1 comprises a communication network RES based on an IMS architecture. The communication network RES is an IMS subsystem of an IP data network of a communication operator. The IMS subsystem is for example a core network having an IMS network architecture as introduced by the 3GPP (3rd Generation Partnership Project) standardization organization for mobile networks.

Conventionally, the communication network RES is interconnected with at least one fixed or mobile access network (not represented) via which terminals connect to access the services supplied by the operator. The communication network RES is here presented in a simplified manner and only the elements needed to understand the invention are represented. The communication network RES comprises a set of entry servers to the network RES: P1, P2, P3. The entry servers P1, P2 and P3 are P-CSCF (Proxy Call State Control Function) servers.

Terminals T1, T2 and T3 are connected to the communication network RES via access networks (not represented). The terminal T1 is, for example, a smartphone based on an operating system OS1 and connected to the network RES via a 4G mobile access network. The terminal T2 is, for example, a smartphone based on an operating system OS2 and connected to the network RES also via a 4G mobile access network.

It is assumed here that the IMS communication network RES is a subsystem interconnected both to 3G/4G mobile access networks and to fixed access networks (ADSL, fiber, cable). The terminal T3 consists, for example, of a fixed telephone TEL connected to a port FXS of a residential gateway Bx. The residential gateway Bx is connected to a fixed network (not represented) which is itself interconnected with the IMS subsystem RES. The domestic gateway Bx makes it possible to offer the users of the telephone TEL a VoIP (voice over IP) communication service via the network RES. Consequently, the operations performed by the terminal T3 are in fact essentially implemented by the domestic gateway Bx connected to the fixed telephone TEL.

To access the communication services provided by the network RES, the terminals T1 to T3 must be registered with the communication network RES by sending a REGISTER message according to the SIP protocol to a P-CSCF server of the network RES.

The address of the P-CSCF with which a terminal must be registered is supplied either via a VoIP configuration file supplied by the operator to the terminal when the user of the terminal subscribes to the operator or via the protocol PCO when the terminal attaches to an LTE or Wifi network. The terminal obtains either directly the IP address of the P-CSCF, or a domain name for which the terminal sends a DNS request to a DNS server to obtain the corresponding IP address.

According to the invention, the operator network supplies, via the VoIP configuration file or the protocol PCO, an IP address or a domain name relating to a proxy server (Prx in FIG. 1) capable of selecting a P-CSCF server according to a particular embodiment of the invention.

Thus, according to the invention, a terminal which wants to register with the network RES sends an SIP REGISTER message to the proxy server Prx which then selects the P-CSCF server most appropriate for the terminal and returns this information to the terminal for it to register with the selected P-CSCF server.

Figure 2:
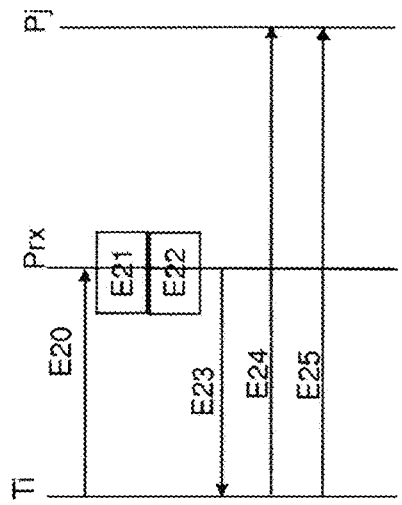
FIG. 2 illustrates steps of the method for selecting an entry server of an IMS communication network and steps of the method for registering a terminal according to a particular embodiment of the invention, FIGS. 3 and 4 schematically illustrate, respectively, a device for selecting an entry server and a terminal capable of respectively implementing the method for selecting an entry server of an IMS communication network and the method for registering a terminal according to a particular embodiment of the invention.

Steps of the method for selecting an entry server of an IMS communication network and steps of the method for registering a terminal are now described according to a particular embodiment of the invention in relation to FIG. 2. The reference Ti denotes a terminal out of the terminals T1 to T3 of FIG. 1, and Pj denotes a P-CSCF server selected from the servers P1 to P3 of FIG. 1.

A set of P-CSCF server selection criteria is stored in memory of the proxy server Prx for the proxy server Prx to select an appropriate P-CSCF server for the terminal Ti according to these criteria. Such selection criteria are based on a characteristic specific to the terminal Ti obtained from a field of an SIP REGISTER message sent by the terminal Ti. Such a characteristic specific to the terminal can correspond:

- to the operating system of the terminal, this information is indicated in a SIP User Agent field of the REGISTER message,
- to the public identity (IMPU, for IP Multimedia Public Identity in English) of the terminal, indicated in the FROM or TO field of the REGISTER message,
- to the type of access used by the terminal, indicated in the PANI field of the REGISTER message,
- to the supplier of the terminal and/or to its software version, indicated via the IMEI (International Mobile Equipment Identity in English) value of the terminal, this value is present in the sip.instance field of the address of contact AoC of the REGISTER message,
- to the services supported by the terminal, indicated in the "features tags" field of the REGISTER message or in the ICSI (IMS Communication Service Identifier in English) field,
- to the SIP methods managed by the terminal, indicated in the "Allow" field of the REGISTER message,
- to the priority of the terminal, indicated by the parameter q, its value being set between 0.0 and 1.0 in the address of contact AoC of the terminal. Thus, in the case of several terminals sharing the same public identity IMPU (multi-terminal), the operator can define a less powerful P-CSCF server or a less robust P-CSCF chain (for example, in the case of failure of a P-CSCF or of network problems) for the lower priority terminals (secondary terminals).

to the request by the terminal to use an IPSec tunnel to transport the SIP call signaling to the P-CSCF, this information being present in a "SIP security-client" and "Require" field of the REGISTER message. Since the use of IP Sec tunnel is costly in terms of resources, the use of this criterion makes it possible to select a more or less powerful P-CSCF server depending on whether the terminal requires the use of IPsec tunnels for the VxLTE, VxWifi communications, to the temporary identity derived from the IMSI of the terminal, which is present in the FROM or TO fields of the REGISTER message, in the form IMSI@ims.MNCxxx.MCCyyy.3gppnetwork.org. A subset of the IMSI (Mobile Network Code and Mobile Country Code) can be found in the domain name present in the URI Request of the REGISTER message. This criterion makes it possible to use a dedicated P-CSCF to handle calls for terminals in a Roamers-In situation (that is to say terminals of another operator registered in the network of the operator of the network RES). By using the MCC (Mobile Country code=yyy) and/or the MNC (Mobile Network Code=xxx), it is possible to select a dedicated P-CSCF for example to handle such calls with a lower QoS level, or to facilitate traceability, or to facilitate the routing, or to activate specific functions, etc., to an emergency call request from the terminal, this information is indicated in the "sos" field in the address of contact of the terminal. It explicitly indicates that the terminal wants to register on the network to make an emergency call. Since the emergency number procedure is complex and requires specific functions at the P-CSCF level (EATF for the anchoring of the emergency calls so as to allow a mobility to 2G/3G CS (Circuit Switches), a mechanism for finding the trusted-verified network location of the terminal, etc.), it is thus possible to select a P-CSCF dedicated to the handling of emergency calls.

It is assumed according to a first example that the selection criteria are defined by the operator as follows:
the P-CSCF server P1 is dedicated to the terminals based on the operating system OS1,
the P-CSCF server P2 is dedicated to the terminals based on the operating system OS2,
the P-CSCF server P3 is dedicated to the fixed terminals.

It is assumed here that the terminal Ti corresponds to the terminal T1 of FIG. 1. In a step E20, the terminal T1 sends to the proxy server Prx an SIP REGISTER message comprising in particular the value OS1 in an SIP User Agent field.

In a step E21, the proxy server Prx obtains the value OS1 of the SIP User Agent field of the SIP REGISTER message received from the terminal T1. The SIP User Agent field is representative of a characteristic specific to the terminal since it comprises in particular an identifier of the operating system of the terminal.

In a step E22, the proxy server Prx selects, from the OS1 value obtained, the P-CSCF server P1 out of the P-CSCF servers P1 to P3.

In a step E23, the proxy server Prx sends to the terminal T1 an SIP 302 MOVED message comprising the IP address of the P-CSCF server P1 selected.

In a step E24, the terminal T1 then sends a new SIP REGISTER message to the P-CSCF server P1 in order to be registered on the communication network RES.

In subsequent SIP registrations, the terminal T1 sends (step E25) the SIP REGISTER messages directly to the P-CSCF server P1 without going through the proxy server Prx.

It is now assumed that the terminal Ti corresponds to the terminal T2 of FIG. 1. In the step E20, the SIP REGISTER message sent by the terminal T2 to the proxy server Prx comprises in particular the value OS2 in an SIP User Agent field.

In the step E21, the proxy server Prx obtains the value OS2 of the SIP User Agent field of the SIP REGISTER message received from the terminal T2 and selects, in the step E22, from the OS2 value obtained, the P-CSCF server P2 out of the P-CSCF servers P1 to P3. In the step E23, the proxy server Prx sends to the terminal T2 an SIP 302 MOVED message comprising the IP address of the P-CSCF server P2 selected for the terminal T2 to send to the P-CSCF server P2 its SIP registration messages (steps E24 and E25).

It appears that, according to the invention the proxy server Prx makes it possible to select a P-CSCF server according to a characteristic specific to the terminal which wants to register.

It is now assumed that the terminal Ti corresponds to the terminal T3 of FIG. 1. In the step E20, the SIP REGISTER message sent by the terminal T3 to the proxy server Prx, comprises, in particular in a FROM or TO field, the value +332365896 corresponding to its public identity. In the step E21, the proxy server Prx obtains this value and identifies that it is an identity linked to a fixed network. The proxy server Prx then selects the P-CSCF server P3 (step E22) and sends to the terminal T3 (step E23) an SIP 302 MOVED message comprising the IP address of the P-CSCF server P3 selected for the terminal T3 to send its SIP registration messages to the P-CSCF server P3 (step E24 and E25).

According to other variant embodiments, the operator can define other selection criteria to be used in place of the criteria defined above or in combination therewith. In this case, the server Prx obtains the values of the fields of the SIP REGISTER message corresponding to these selection criteria.

According to another particular embodiment of the invention, in the step E23, the proxy server Prx also inserts into the redirect message a port number and a transport protocol to be used between the terminal Ti and the P-CSCF server Pj selected to communicate. The proxy server Prx determines the port number and the transport protocol for example from the "features tags" field of the SIP REGISTER message received in the step E20. For the terminal T1, such a field contains, for example, the value "+g.oma.sip-im". Such a value indicates that the terminal T1 supports the RCS (Rich Communication Suite) service. In the step E22, the proxy server Prx then selects, for the terminal T1, the P-CSCF server P1 since the operating system of the terminal T1 is OS1 and determines that the terminal T1 must use the port number 5080 and the TCP transport protocol to communicate with the P-CSCF server P1.

According to another particular embodiment of the invention, in which the terminal T1 and the terminal T3 are associated with a same public identity, when the proxy server Prx receives a registration message from the terminal T3, the proxy server determines that the terminal T1 associated with the same public identity has previously been registered via the P-CSCF P1. According to this particular embodiment of the invention, the operator has specified that terminals sharing a same public identity must be registered on a same P-CSCF. In this particular embodiment of the invention, the proxy server Prx then selects, in the step E22, on the basis of the IMPU of the terminal T3, the P-CSCF server P1. As a variant, the proxy server Prx also takes account of the value q of the priority parameter of the terminal T3. According to this variant, the proxy server Prx selects the P-CSCF server P1 if the terminal T3 also has a priority value q identical to or higher than that of the terminal T1. In the case where the terminal T3 has a priority value q lower than the terminal T1, the proxy server Prx selects the P-CSCF server P3 for example.

Figure 3:
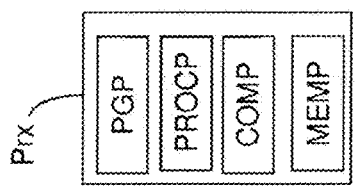

FIG. 3 schematically illustrates a device Prx for selecting an entry server capable of implementing the method for selecting an entry server of an IMS communication network according to a particular embodiment of the invention.

The device Prx has the conventional architecture of a computer. The device Prx comprises a storage module MEMP, for example a memory, a processing module PROCP, equipped for example with a microprocessor, and driven by a computer program PGP.

On initialization, the code instructions of the computer program PGP are for example loaded into memory MEMP before being executed by the processor of the processing module PROCP.

According to the instructions of the computer program PGP, the processor of the processing module PROCP implements the steps of the method for selecting an entry server of an IMS communication network as described in relation to FIG. 2. The processor of the processing module PROCR implements in particular the steps of reception, from a terminal, of a registration message sent according to the SIP protocol, of obtaining of a value of at least one field of the SIP registration message, said field being representative of a characteristic specific to the terminal, of selection of an entry server, from at least said obtained value, and of sending of an SIP redirect message to the terminal comprising an IP address of said selected entry server.

The device Prx also comprises a communication module COMP suitable for communicating with other equipment items, in particular via the communication network RES described in relation to FIG. 1. The communication module COMP cooperates with the processing module PROCP to allow, in particular, the device Prx to receive an SIP registration message from a terminal and to send an SIP redirect message to the terminal.

According to a particular embodiment of the invention, the device Prx is included in a server.

Figure 4:
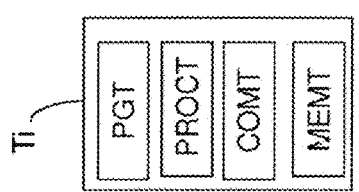

FIG. 4 schematically illustrates a terminal Ti capable of implementing the method for registering the terminal Ti in an IMS communication network according to a particular embodiment of the invention.

The terminal Ti has the conventional architecture of a telephone terminal or of a computer. The terminal Ti comprises a storage module MEMT, for example a memory, a processing module PROCT, equipped, for example, with a microprocessor, and driven by a computer program PGT.

On initialization, the code instructions of the computer program PGT are for example loaded into memory MEMT before being executed by the processor of the processing module PROCT.

According to the instructions of the computer program PGT, the processor of the processing module PROCT implements the steps of the method for registering the terminal Ti in an IMS communication network as described in relation to FIG. 2. The processor of the processing module PROCT implements in particular the steps of sending of a first registration message to a proxy server Prx of the IMS communication network, the first registration message comprising at least one field representative of a characteristic specific to the terminal, of reception, from the proxy server Prx, of a redirect message comprising an IP address of an entry server of the IMS communication network, the entry server being selected from a value of said at least one field, and of sending of a second registration message to said entry server of the IMS communication network.

The terminal Ti also comprises a communication module COMT capable of communicating with other equipment items via, in particular, the communication network RES described in relation to FIG. 1. The communication module COMT cooperates with the processing module PROCT to allow, in particular, the terminal Ti to send a first SIP registration message to the proxy server Prx, to receive an SIP redirect message, and to send, to the selected entry server, a second SIP registration message.

According to a particular embodiment of the invention, the terminal Ti is a smartphone, a fixed or mobile telephone, a tablet, a softphone (software telephone), a domestic gateway, etc.

Although the present disclosure has been described with reference to one or more examples, workers skilled in the art will recognize that changes may be made in form and detail without departing from the scope of the disclosure and/or the appended claims.

The invention claimed is:

1. A method implemented by a proxy server of an Internet Protocol (IP) Multimedia Subsystem (IMS) communication network, comprising:
receiving from a terminal a first registration request sent according to a Session Initiation Protocol (SIP);
obtaining a value of at least one field of the first registration request, said field being representative of a characteristic specific to the terminal;
selecting, from at least said obtained value, an entry server of a set of entry servers of said IMS communication network, said selected entry server having a configuration suited to said characteristic; and
sending to the terminal a SIP redirect message comprising an IP address of the selected entry server to be used for at least one subsequent registration request of the terminal for registering to the IMS network.

2. The method as claimed in claim 1, in which the field of the first registration request is a SIP PANI field.

3. The method as claimed in claim 1, in which the redirect message comprises a port number and a protocol determined by the proxy server as a function of a field of the first registration request received by the proxy server.

4. The method of claim 1 wherein said SIP redirect message is a moved redirection message.

5. The method of claim 1 wherein said characteristic specific to the terminal comprises information corresponding to a type of the terminal.

6. The method of claim 1 wherein said characteristic specific to the terminal comprises information corresponding to an operating system of the terminal.

7. The method of claim 1 wherein said characteristic specific to the terminal comprises information corresponding to a supplier and/or a software version of the terminal.

8. The method of claim 1 wherein said characteristic specific to the terminal comprises information corresponding to at least one service supported by the terminal.

9. The method of claim 1 wherein said characteristic specific to the terminal comprises information corresponding to at least one SIP method managed by the terminal.

10. The method of claim 1 wherein said characteristic specific to the terminal comprises information corresponding to a priority of the terminal.

11. A method implemented by a terminal of an Internet Protocol (IP) Multimedia Subsystem (IMS) communication network, comprising:
sending a first registration request to a proxy server of the IMS communication network, said first registration request comprising at least one field representative of a characteristic specific to the terminal;
receiving, from the proxy server, a redirect message comprising an IP address of an entry server of the IMS communication network, the entry server having been selected by the proxy server from a value of said at least one field and having a configuration suited to said characteristic; and
sending at least one subsequent registration request for registering to the IMS network to the entry server of the IMS communication network.

12. The method as claimed in claim 11, in which the field of the first registration request is a SIP PANI field.

13. The method as claimed in claim 11, in which the redirect message comprises a port number and a protocol determined by the proxy server as a function of a field of the first registration request received by the proxy server.

14. The method of claim 11 wherein said SIP redirect message is a moved redirection message.

15. A proxy server of an Internet Protocol (IP) Multimedia Subsystem (IMS) communication network, comprising:
a processor; and
a non-transitory computer-readable medium comprising instructions stored thereon, which when executed by the processor configure the proxy server to perform acts comprising:
receiving from a terminal a first registration request sent according to a Session Initiation Protocol (SIP);
obtaining a value of a field of the first registration request, said field being representative of a characteristic specific to the terminal;
selecting, from the obtained value, an entry server having a configuration suited to said characteristic; and
sending to the terminal a SIP redirect message comprising an IP address of the selected entry server to be used for at least one subsequent registration request of the terminal to the IMS network.

16. The proxy server of claim 15 wherein said SIP redirect message is a moved redirection response.

17. A terminal comprising:
a processor; and
a non-transitory computer-readable medium comprising instructions stored thereon, which when executed by the processor configure the terminal to perform acts comprising:
sending a first registration request to a proxy server of an Internet Protocol (IP) Multimedia Subsystem (IMS) communication network, said first registration request comprising at least one field representative of a characteristic specific to the terminal;
receiving, from the proxy server, a redirect message comprising an IP address of an entry server of the IMS communication network, the entry server having been selected by the proxy server from a value of said at least one field and having a configuration suited to said characteristic; and
sending at least one subsequent registration request for registering to the IMS network to the entry server of the IMS communication network.

18. The terminal of claim 17 wherein said SIP redirect message is a moved redirection message.

19. A non-transitory computer-readable medium comprising program code instructions stored thereon for executing, when the instructions are run by a processor of a proxy server of an Internet Protocol (IP) Multimedia Subsystem (IMS) communication network, a method comprising:
receiving from a terminal a first registration request sent according to a Session Initiation Protocol (SIP);
obtaining a value of at least one field of the first registration request, said field being representative of a characteristic specific to the terminal;
selecting, from at least said obtained value, an entry server of a set of entry servers of said IMS communication network, said selected entry server having a configuration suited to said characteristic; and
sending to the terminal a SIP redirect message comprising an IP address of said selected entry server to be used for at least one subsequent registration request of the terminal to the IMS network.

20. A non-transitory computer-readable medium comprising program code instructions for executing, when the instructions are run by a processor of a terminal of an Internet Protocol (IP) Multimedia Subsystem (IMS) communication network, a method comprising:
sending a first registration request to a proxy server of the IMS communication network, said first registration-request comprising at least one field representative of a characteristic specific to the terminal,
receiving, from the proxy server, a redirect message comprising an IP address of an entry server of the IMS communication network, the entry server having been selected by the proxy server from a value of said at least one field and having a configuration suited to said characteristic; and
sending at least one subsequent registration request for registering to the IMS network to the entry server of the IMS communication network.

* * * * *